United States Patent
Inagaki

(10) Patent No.: US 9,143,606 B2
(45) Date of Patent: Sep. 22, 2015

(54) PORTABLE ELECTRONIC DEVICE, SOUND OUTPUT METHOD, AND SOUND OUTPUT PROGRAM

(75) Inventor: Tomohiro Inagaki, Kanagawa (JP)

(73) Assignee: KYOCERA COPORATION, Kyoto (JP)

( * ) Notice: Subject to any disclaimer, the term of this patent is extended or adjusted under 35 U.S.C. 154(b) by 0 days.

(21) Appl. No.: 13/597,793

(22) Filed: Aug. 29, 2012

(65) Prior Publication Data

US 2013/0053094 A1 Feb. 28, 2013

(30) Foreign Application Priority Data

Aug. 29, 2011 (JP) ................................ 2011-186518

(51) Int. Cl.
*H04W 88/02* (2009.01)
*H04M 1/725* (2006.01)
*H04M 1/60* (2006.01)

(52) U.S. Cl.
CPC ........ *H04M 1/72591* (2013.01); *H04M 1/6025* (2013.01)

(58) Field of Classification Search
CPC ... H04M 1/0214; H04M 1/03; H04M 1/6016; H04M 1/6008; H04M 1/60; H04M 1/7259; H04M 1/72563; H04M 3/40
USPC ................. 455/63.1, 218–223, 234.1–253.2, 455/278.1, 279.1, 283–288, 296, 550.1
See application file for complete search history.

(56) References Cited

U.S. PATENT DOCUMENTS

| | | | | |
|---|---|---|---|---|
| 4,491,980 A | * | 1/1985 | Ichikawa | ...................... 455/344 |
| 4,926,459 A | * | 5/1990 | Advani et al. | ................... 379/52 |
| 2004/0001602 A1 | * | 1/2004 | Moo et al. | ..................... 381/315 |

FOREIGN PATENT DOCUMENTS

| | | | | |
|---|---|---|---|---|
| JP | 2000209698 A | * | 7/2000 | ............. H04R 25/00 |
| JP | 200251112 A | | 2/2002 | |
| JP | 2009-267877 A | | 11/2009 | |
| JP | 2009267877 A | | 11/2009 | |

OTHER PUBLICATIONS

Docomo SMART series N-05C Instruction Manual URL:https://www.nttdocomo.co.jp/binary/pdf/support/trouble/manual/download/N-05C__J__OP__All.pdf, pp. 1-2.
Notice of Reasons for Rejection for corresponding Japanese Application No. 2011-186518, pp. 1-2, mailed Oct. 21, 2014.

* cited by examiner

*Primary Examiner* — Vladimir Magloire
*Assistant Examiner* — Erica Navar
(74) *Attorney, Agent, or Firm* — Lowe Hauptman & Ham, LLP

(57) ABSTRACT

A portable electronic device includes a communication unit, a microphone that receives sound, a receiver that outputs sound, and a correcting unit that corrects quality of sound, and while a telephone call is being made by the communication unit, the receiver outputs sound input from the microphone and corrected by the correcting unit, and sound received by the communication unit.

1 Claim, 5 Drawing Sheets

PORTABLE ELECTRONIC DEVICE, SOUND OUTPUT METHOD, AND SOUND OUTPUT PROGRAM

This application is based on and claims the benefit of priority from Japanese Patent Application No. 2011-186518, filed on 29 Aug. 2011, the content of which is incorporated herein by reference.

BACKGROUND OF THE INVENTION

1. Field of the Invention

The present invention relates to a portable electronic device with a sound collecting function, and to a sound output method and a sound output program.

2. Related Art

An increasing number of users with hearing loss are using mobile telephone devices. In this regard, Japanese Unexamined Patent Application, Publication No. 2009-267877, for example, discloses a mobile telephone device that switches between: a first mode in which sound externally collected into a body is output from an earpiece; and a second mode in which sound of the other party of a telephone call is output from a receiver. The mobile telephone device can compensate for hearing loss of a user by activating the first mode.

SUMMARY OF THE INVENTION

For a user with hearing loss, not only the voice of another person but also his/her own voice sounds quiet. Such a user becomes tired by talking in a voice louder than necessary. However, the mobile telephone device disclosed in Japanese Unexamined Patent Application, Publication No. 2009-267877 cannot address such a problem, and cannot provide a satisfactory telephone call.

An object of the present invention is to provide a portable electronic device, a sound output method and a sound output program, all of which can provide a satisfactory telephone call.

The portable electronic device according to the present invention includes: a body; a communication unit; an input unit that receives sound; an output unit that outputs sound; and a correcting unit that corrects quality of sound; and while a telephone call is being made by the communication unit, the output unit outputs sound input from the input unit and corrected by the correcting unit, and sound received by the communication unit.

In the portable electronic device according to the present invention, it is preferable for the correcting unit to correct sound of the telephone call received by using the communication unit, and it is preferable for the output unit to output the sound input from the input unit and corrected by the correcting unit, and the sound received by the communication unit and corrected by the correcting unit.

In the portable electronic device according to the present invention, it is preferable for the correcting unit to correct the sound input from the input unit for each predetermined frequency.

In the portable electronic device according to the present invention, it is preferable for the sound input from the input unit to be output to the communication unit and the correcting unit.

In the portable electronic device according to the present invention, it is preferable for the correcting unit to mix the sound input from the input unit with the sound received by the communication unit, and to correct the sound thus mixed.

In the portable electronic device according to the present invention, it is preferable for the correcting unit to correct the sound input from the input unit, to correct the sound received by the communication unit, and to mix the two sounds thus corrected.

It is preferable for the portable electronic device according to the present invention to further include an operation unit, and it is preferable for the control unit to control an output of sound to the correcting unit, in accordance with an operation by the operation unit.

The sound output method according to the present invention is a sound output method for outputting sound by a portable electronic device including a communication unit, an input unit that receives sound, an output unit that outputs sound, and a correcting unit that corrects quality of sound, in which the method includes the step of: outputting, by the output unit, sound input from the input unit and corrected by the correcting unit, and sound received by the communication unit, while a telephone call is being made by the communication unit.

The sound output program according to the present invention is a sound output program for outputting sound by a portable electronic device including a communication unit, a sound input unit that receives sound, a sound output unit that outputs sound, and a correcting unit that corrects quality of sound, in which the program causes the portable electronic device to execute the step of outputting, by the output unit, sound input from the input unit and corrected by the correcting unit, and sound received by the communication unit, while a telephone call is being made by the communication unit.

According to the present invention, a satisfactory telephone call can be made.

DETAILED DESCRIPTION OF THE INVENTION

Descriptions are hereinafter provided for a mobile telephone device as a portable electronic device of the present invention.

First Embodiment

Figure 1:
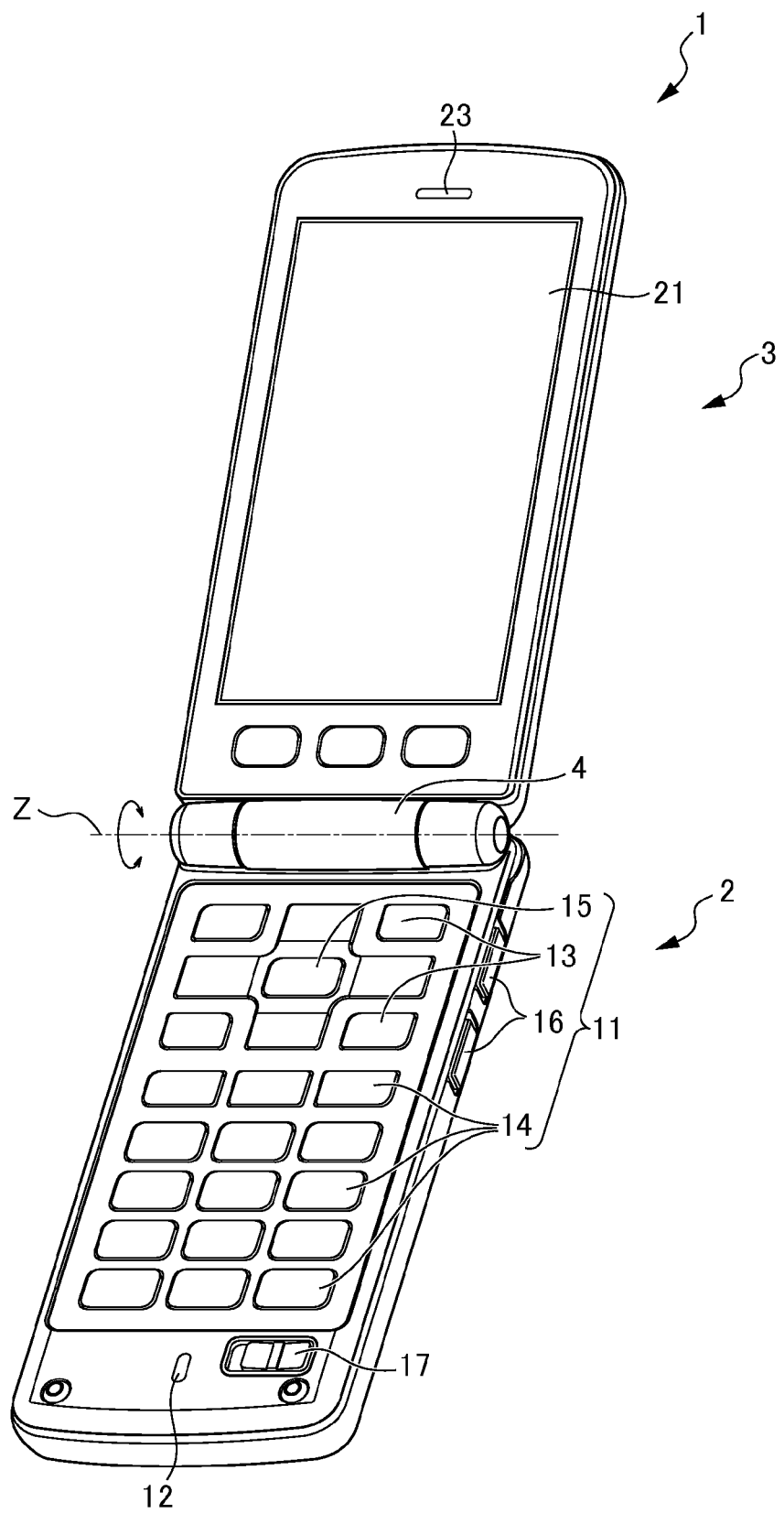
FIG. 1 is a perspective view showing an appearance of a mobile telephone device according to a first embodiment.

FIG. 1 is a perspective view showing an appearance of the mobile telephone device according to a first embodiment.

As shown in FIG. 1, the mobile telephone device 1 includes a first body 2 and a second body 3. The mobile telephone device 1 includes a connecting portion 4 that connects the first body 2 and the second body 3 so as to be openable and closable.

The first body 2 includes an operation unit 11, a microphone 12 as an input unit, a power supply operation unit 17, and various interfaces (not shown).

The operation unit 11 includes function keys 13, character keys 14, an operation key 15, and side keys 16.

The function keys 13 are used for various settings and activation of various functions such as a telephone directory function or a mail function of the mobile telephone device 1. The character keys 14 are used for inputting characters such as numeric characters of a telephone number or non-numeric characters of mail. The operation key 15 is used for making determinations with regard to various operations or scrolling in upper, lower, left and right directions. The side keys 16 are used for various settings and activation of various functions such as the telephone directory function or the mail function of the mobile telephone device 1.

A function is assigned to each key composing the operation unit 11. The assignment of these functions is changed in accordance with the opened state or the closed state, various modes, or the type of an application running on the mobile telephone device 1. When any of the keys is depressed by a user, the mobile telephone device 1 operates in accordance with a function assigned to the key thus depressed.

The microphone 12 is at an end portion in a longitudinal direction of the first body 2. The microphone 12 is on a side opposite to the connecting portion 4. The microphone 12 is disposed at one end portion in the opened state of the mobile telephone device 1. The microphone 12 receives sound uttered by the user, environment sound around the mobile telephone device 1, or the like. When sound is input from the microphone 12, the sound is output to a control unit 34 (to be described below).

The power supply operation unit 17 is an operation unit for turning on or off a main power supply of the mobile telephone device 1.

The various interfaces include an interface for communicating with an external device (for example, a host device), and an interface for inserting and removing external memory. The various interfaces are covered with caps when not in use.

The second body 3 includes a display unit 21, a receiver 23 as an output unit, and a sub-display unit.

The display unit 21 is configured to be capable of displaying a variety of information such as character information or image information.

The receiver 23 is disposed at the end portion in the longitudinal direction of the second body 3. The receiver 23 is on a side opposite to the connecting portion 4. The receiver 23 is disposed at another end portion in the opened state of the mobile telephone device 1. The receiver 23 outputs sound.

The connecting portion 4 includes an opening and closing hinge mechanism. The connecting portion 4 is disposed between the end portion of the first body 2 and the end portion of the second body 3. The connecting portion 4 connects the first body 2 and the second body 3 so as to be mutually pivotable. The hinge mechanism serves as a pivot axis Z of the pivoting of the first body 2 and the second body 3.

Descriptions are provided for a functional configuration of the mobile telephone device 1.

Figure 2:
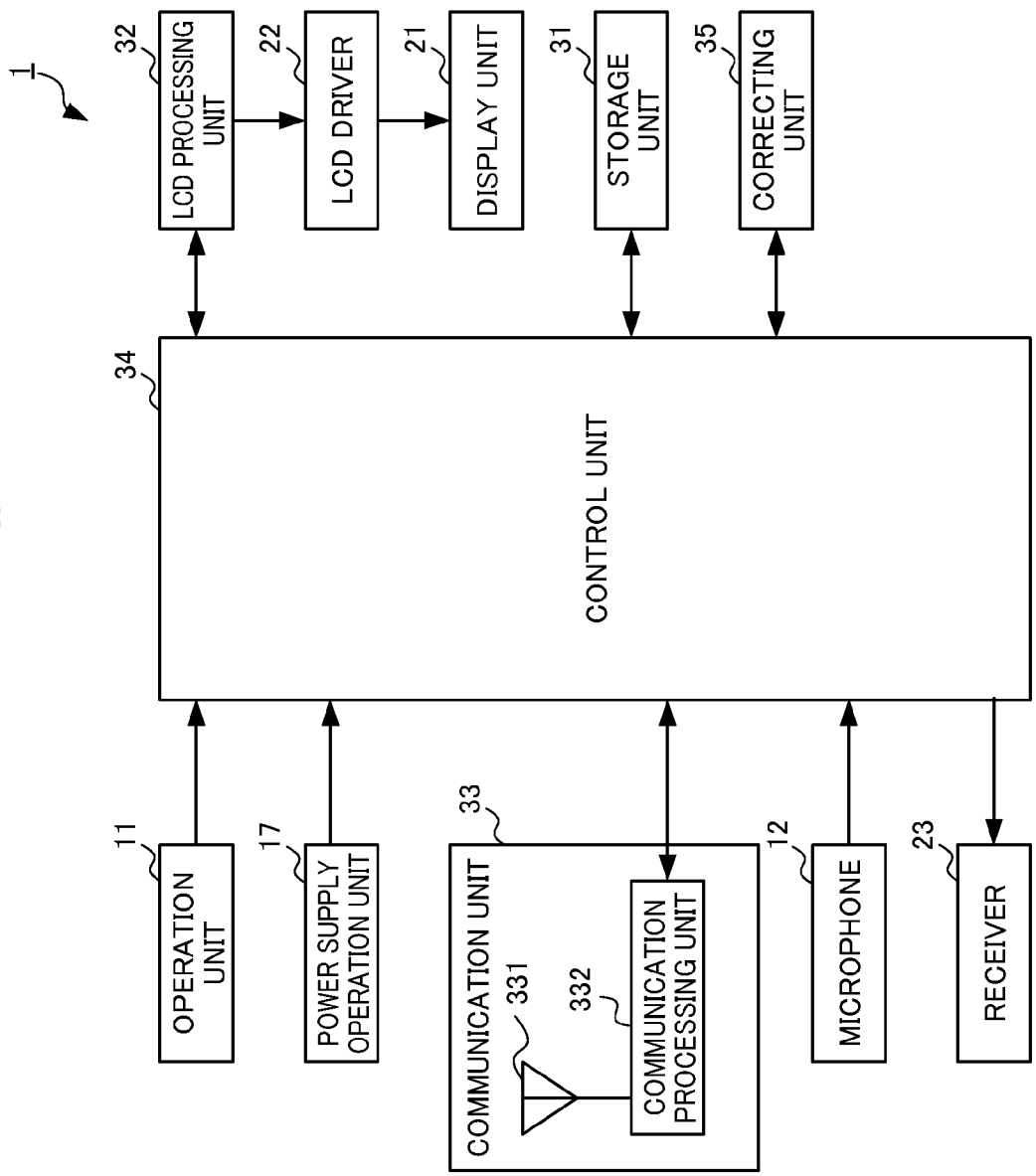
FIG. 2 is a block diagram showing functions of the mobile telephone device according to the first embodiment.

FIG. 2 is a block diagram showing a functional configuration of the mobile telephone device according to the first embodiment.

As shown in FIG. 2, the mobile telephone device 1 includes the operation unit 11, the microphone 12, the power supply operation unit 17, the display unit 21, an LCD driver 22, the receiver 23, a storage unit 31, an LCD processing unit 32, a communication unit 33, the control unit 34, and a correcting unit 35.

The storage unit 31 stores a plurality of application programs. The storage unit 31 may be fixed inside the mobile telephone device 1, or may be removable.

The LCD processing unit 32 executes image processing. The LCD processing unit 32 outputs image data thus processed to the LCD driver 22. The LCD driver 22 includes frame memory. When the image data is transmitted from the LCD processing unit 32, the LCD driver 22 stores the image data into the memory. The LCD driver 22 outputs the image data stored in the memory to the display unit 21. In a case in which the control unit 34 executes the image processing, the mobile telephone device 1 may not include the LCD processing unit 32.

The communication unit 33 includes an antenna unit 331 and a communication processing unit 332.

The antenna unit 331 executes wireless communication with a base station through signals modulated in a predetermined frequency band (for example, an 800 MHz band). The antenna unit 331 transmits sound signals modulated by the communication processing unit 332 to the base station. The antenna unit 331 communicates with other communication devices through the base station.

The communication processing unit 332 modulates signals to be transmitted to the base station in a predetermined frequency band. The communication processing unit 332 demodulates signals received from the base station in a predetermined frequency. The communication processing unit 332 outputs signals thus demodulated to the control unit 34.

The control unit 34 controls the entirety of the mobile telephone device 1.

The control unit 34 includes, for example, a CPU (Central Processing Unit). The control unit 34 may include a plurality of microprocessors.

When sound is input from the microphone 12, the control unit 34 outputs the sound to the communication unit 33 and the correcting unit 35. When sound is input from the communication processing unit 332, the control unit 34 outputs the sound to the correcting unit 35. When the sound corrected by the correcting unit 35 is input into the control unit 34, the control unit 34 outputs the corrected sound from the receiver 23.

The control unit 34 changes an output destination of sound, in accordance with an operation for switching the output destination (switching operation) by the operation unit 11. The control unit 34 switches the output destination of the sound modulated by the communication processing unit 332, from the correcting unit 35 to the receiver 23, in accordance with an operation for switching the output destination (switching operation) by the operation unit 11. In this case, when sound is input from the microphone 12, the control unit 34 outputs the sound to the communication unit 33 only.

The correcting unit 35 corrects quality of sound that is input.

Figure 3:
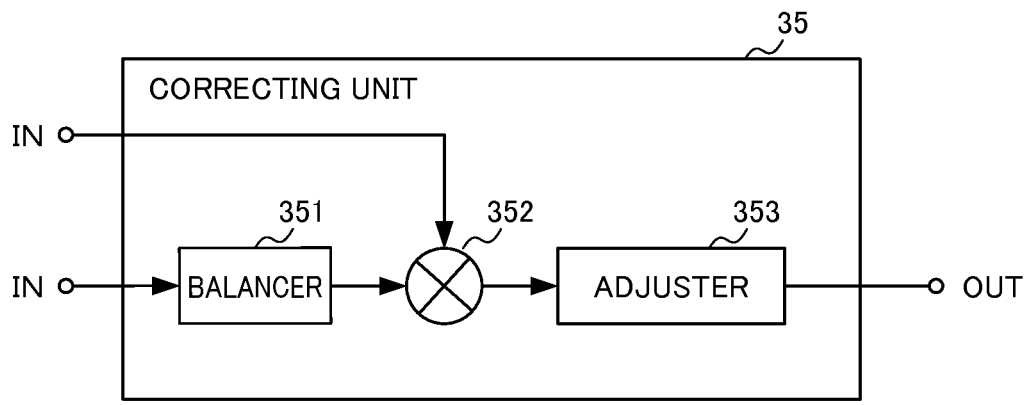
FIG. 3 is a block diagram showing functions of a correcting unit according to the first embodiment.

Descriptions are provided for detailed functions of the correcting unit 35 with reference to FIG. 3. FIG. 3 is a block diagram showing the functions of the correcting unit 35 according to the first embodiment. The correcting unit 35 includes a balancer 351, a mixer 352, and an adjuster 353.

The balancer 351 adjusts the volume of the sound that is input from the microphone 12, and the volume of the sound from the other party whom the user is talking with. The balancer 351 reduces or increases all frequency components of the sound that is input from the microphone 12.

The mixer 352 mixes the sound input from the microphone 12 with the sound received by the communication unit 33.

The adjuster 353 corrects quality of sound that is input. When the quality of the sound is corrected, the adjuster 353 outputs the sound to the control unit 34.

Figure 4:
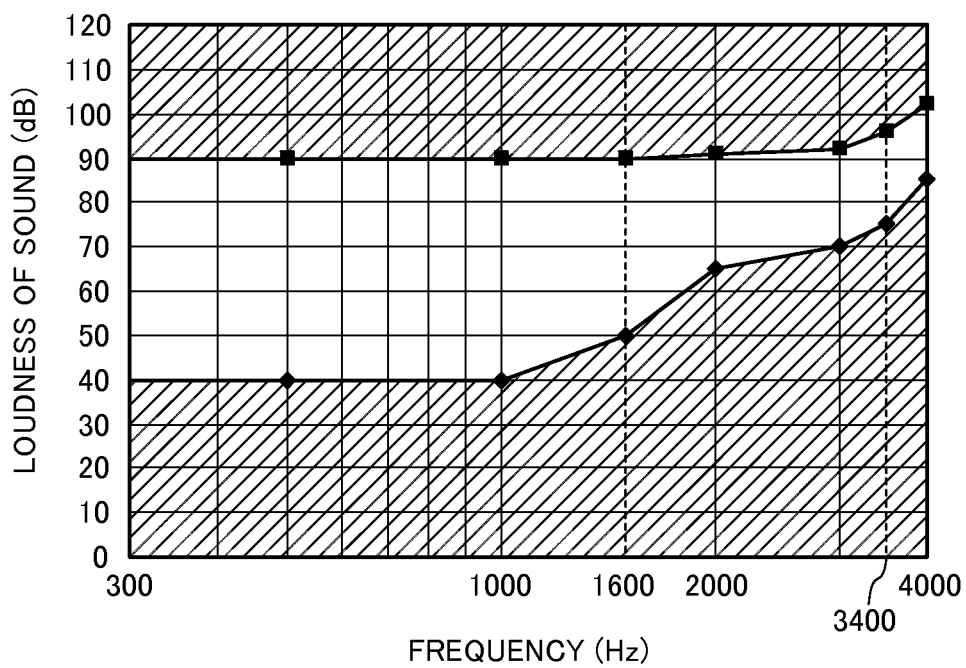
FIG. 4 is a diagram showing adjustment target characteristics for correcting quality of sound.

FIG. 4 is a conceptual diagram showing adjustment target characteristics for correcting quality of sound. The adjuster 353 adjusts the sound for each frequency, such that the loudness of the sound falls within a range between two polygonal lines shown in a graphic chart of FIG. 4. Herein, the correction parameter is set in a frequency band. For example, the adjuster 353 adjusts the volume of the sound at 1600 Hz to fall within a range of 40 dB (decibel) to 90 dB.

Figure 5:
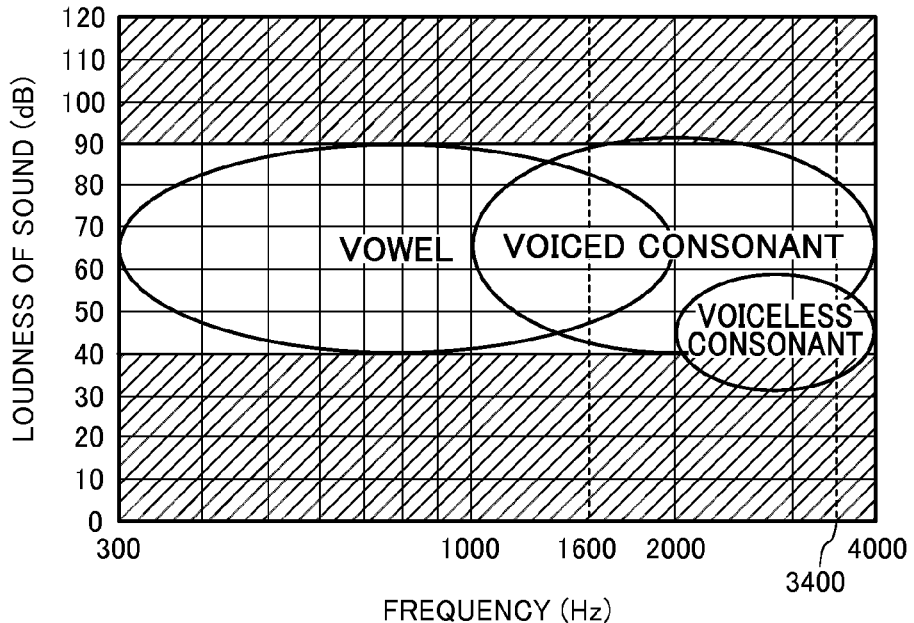
FIG. 5 is a diagram showing hearing acuity characteristics of a person without hearing loss.
Figure 6:
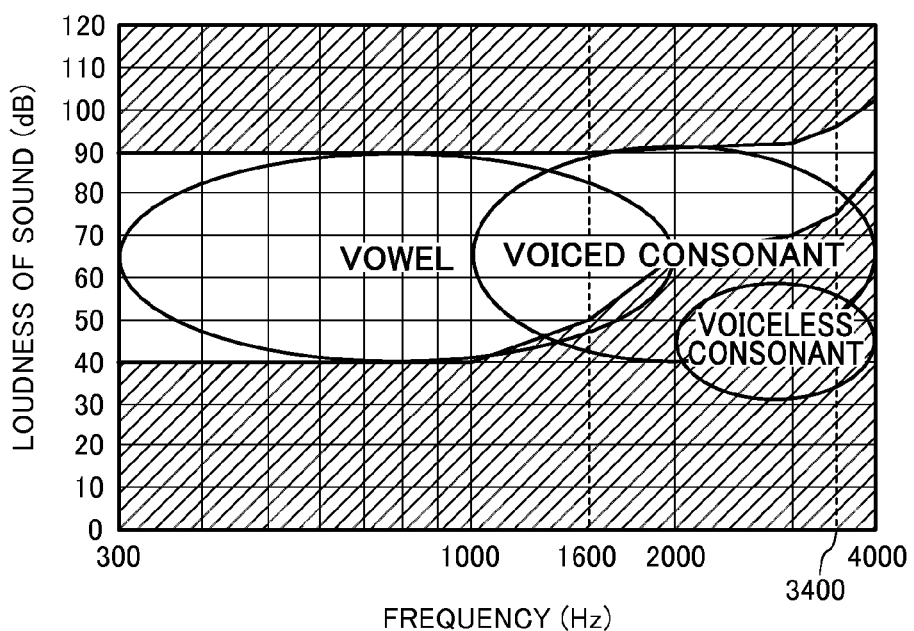
FIG. 6 is a diagram showing hearing acuity characteristics of a person with hearing loss.
Figure 7:
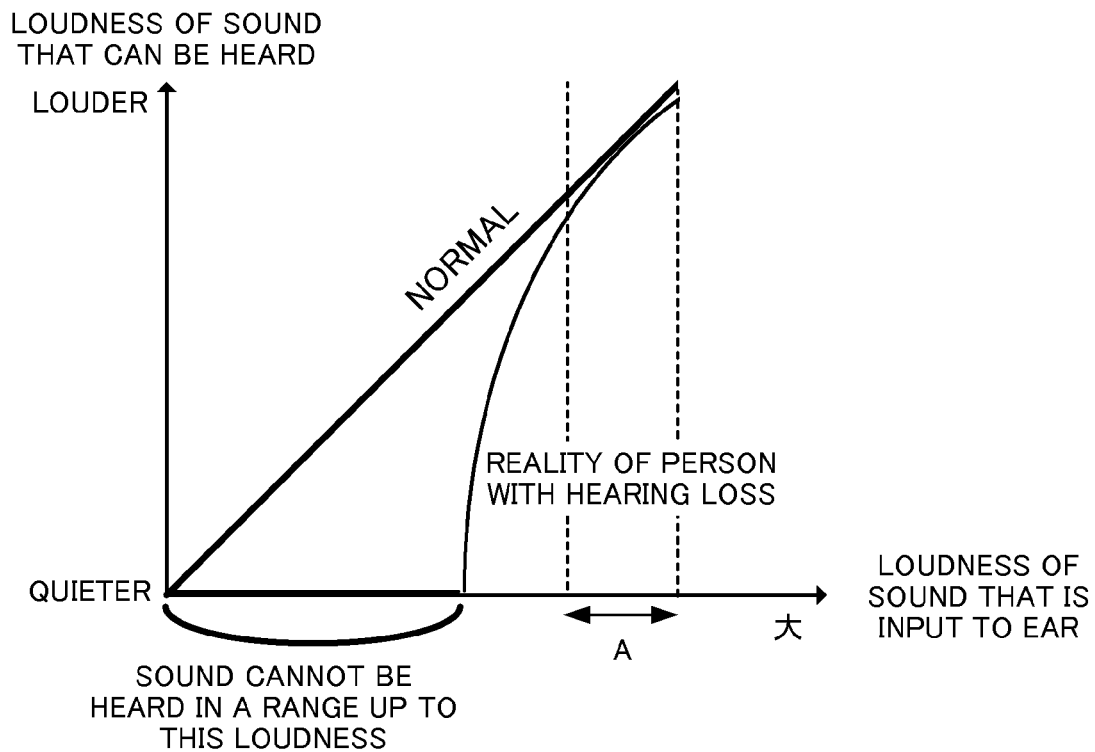
FIG. 7 is a diagram for comparing how sound is heard by a person without hearing loss, and how sound is heard by a person with hearing loss.

Descriptions are provided for a method of correcting quality of sound, in which the adjuster 353 executes the correction. FIG. 5 is a diagram showing hearing acuity characteristics of a person without hearing loss. FIG. 6 is a diagram showing hearing acuity characteristics of a person with hearing loss. FIG. 7 is a diagram for comparing how sound is heard by a person without hearing loss, and how sound is heard by a person with hearing loss.

As shown in FIG. 5, partitioning is performed to have an area of 90 dB and higher and an area of 40 dB and lower. As shown in FIG. 5, it is hard for a person without hearing loss to hear sound of 40 dB or lower. Sound of 90 dB or higher is generally felt to be too loud for a person without hearing loss. As shown in FIG. 6, when the loudness of sound that is satisfactorily heard by a person without hearing loss is compared with the loudness of sound that is satisfactorily heard by a person with hearing loss, the loudness is different between the two in a high frequency range. For example, at a frequency of 3000 Hz, it is hard for a person with hearing loss to hear sound of about 65 dB and lower. At a frequency of 4000 Hz, a person with hearing loss does not feel it too loud when hearing sound of about 100 dB.

FIGS. 5 and 6 show loudness of sound classified into vowels, voiced consonants, and voiceless consonants. As shown in FIGS. 5 and 6, vowels and voiced consonants generally fall within a range of 40 dB to 90 dB. Voiceless consonants generally fall within a range of 30 dB to 60 dB in a high frequency range. There is a tendency for voiceless consonants to be heard as being quieter than vowels and voiced consonants.

As shown in FIG. 5, in a frequency range of 300 Hz to 3400 Hz, a person without hearing loss can hear sound of 40 dB to 90 dB. As shown in FIG. 6, there is a tendency for it to be harder for a person with hearing loss to hear sound as the frequency becomes higher. There is a tendency for it to be hard for a person with hearing loss who can hear vowels to hear voiced consonants and voiceless consonants.

As shown in FIG. 7, a person with hearing loss can hardly hear sound that is quieter than a predetermined loudness. If the sound is louder than the predetermined loudness, a person with hearing loss can hear the sound in the same way as a person without hearing loss can. For example, a person with hearing loss can hear sound of loudness in a range A shown in FIG. 7 in the same way as a person without hearing loss can.

When sound at a frequency falls below the audible limit of sound pressure, the adjuster 353 executes gain adjustment to increase the loudness of the sound above the audible limit. As a result of such gain adjustment, it becomes easier for a person with hearing loss to hear voiced consonants and voiceless consonants. When sound at a frequency exceeds the limit of sound pressure that is felt too loud, the adjuster 353 executes gain adjustment to decrease the loudness of the sound below the limit. As a result of such gain adjustment, it becomes easier for a person with hearing loss to hear relatively loud sound as well.

The mobile telephone device 1 may be configured to provide adjustment target characteristics for correcting quality of sound, in accordance with age. In response to receiving age via the operation unit 11, the correcting unit 35 corrects sound based on the adjustment target characteristics corresponding to the age.

In the mobile telephone device 1, adjustment target characteristics for correcting sound may be set in multiple stages in accordance with degrees of hearing loss. In a case of such a configuration, selection of adjustment target characteristics is received via the operation unit 11, and the correcting unit 35 corrects sound based on the adjustment target characteristics thus selected.

According to the first embodiment, the following effects are achieved.

The receiver 23 outputs the sound input from the microphone 12 and corrected by the correcting unit 35, and the sound received by the communication unit 33. With the mobile telephone device 1, the user can hear his/her own voice thus corrected from the receiver 23. Even a person with hearing loss can easily hear the sound thus corrected. By hearing his/her own voice during a telephone call, a person with hearing loss can recognize that his/her own voice is communicated to the other party. With the mobile telephone device 1, the user can speak with a voice at moderate volume.

The receiver 23 outputs the sound input from the microphone 12 and corrected by the correcting unit 35, and the sound received by the communication unit 33 and corrected by the correcting unit 35. Since the mobile telephone device 1 outputs the corrected sound of the other party whom the user is talking with, it is easy for the user to hear the voice of the other party.

The correcting unit 35 corrects the sound input from the microphone 12 for each predetermined frequency. For example, the mobile telephone device 1 can amplify voiced consonants and voiceless consonants that are hard for a person with hearing loss to hear. The mobile telephone device 1 can make it easier for a person with hearing loss to hear voiced consonants and voiceless consonants.

When sound is input from the microphone 12, the communication unit 33 can transmit the sound without correcting the sound.

The sound input from the microphone 12 is mixed with the sound received by the communication unit 33, and the correcting unit 35 corrects the sound thus mixed. The mobile telephone device 1 can concurrently correct the sound input from the microphone 12, and the sound received by the communication unit 33. By simplifying the correcting processing, the mobile telephone device 1 can reduce the sound delay resulting from the processing delay.

The control unit 34 performs switching with regard to whether to output the sound to the correcting unit 35, in accordance with an operation by the operation unit 11. The mobile telephone device 1 can correct the sound only in a case in which the user desires the sound to be corrected. For example, in a case in which a plurality of persons with different hearing acuity use the mobile telephone devices 1, the plurality of persons can individually correct the sound in accordance with their own situations.

Second Embodiment

A second embodiment is described with reference to FIG. 8.

Figure 8:
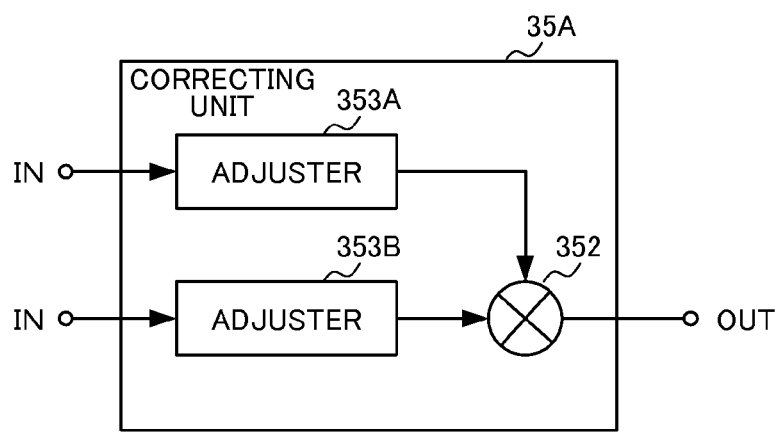
FIG. 8 is a block diagram showing functions of a correcting unit according to a second embodiment.

FIG. 8 is a block diagram showing functions of a correcting unit according to the second embodiment.

A mobile telephone device according to the second embodiment is different from the mobile telephone device according to the first embodiment in two points, and is similar to the mobile telephone device according to the first embodiment in other configurations. The same reference numerals are assigned to configurations identical to those of the mobile telephone device 1 of the first embodiment, and detailed descriptions thereof are omitted. The first different point is that the sound input from the microphone 12 is corrected independently of correcting the sound received by the communication unit 33. The second different point is that the two sounds thus corrected are then mixed.

As shown in FIG. 8, a correcting unit 35A includes a first adjuster 353A, a second adjuster 353B, and a mixer 352.

The first adjuster 353A corrects quality of sound that is input. The sound thus input refers to a sound signal that is demodulated by the communication processing unit 332. The first adjuster 353A corrects the sound thus input, in a way similar to the way of correction described in the first embodiment. When the quality of the sound is corrected, the first adjuster 353A outputs the sound to the mixer 352.

The second adjuster 353B corrects quality of sound that is input. The sound thus input is the sound that is input from the microphone 12. The second adjuster 353B has functions similar to the functions of the balancer 351 of the first embodiment. By adjusting the volume of the sound input from the microphone 12, the second adjuster 353B adjusts the balance between: the volume of the sound input from the microphone 12; and the volume of the sound from the other party whom the user is talking with. The second adjuster 353B reduces or increases all frequency components of the sound input from the microphone 12. The second adjuster 353B corrects the sound thus input, in a way similar to the way of correction described in the first embodiment. When the quality of the sound is corrected, the second adjuster 353B outputs the sound to the mixer 352.

Adjustment target characteristics to be used by the first adjuster 353A for correcting quality of sound may be different from adjustment target characteristics to be used by the second adjuster 353B for correcting quality of sound.

The mixer 352 mixes the two sounds thus corrected. The mixer 352 outputs the sound thus mixed from the receiver 23.

According to the second embodiment, while making a telephone call by the communication unit 33, the sound input from the microphone 12 is corrected, the sound received by the communication unit 33 is corrected, and the two sounds thus corrected are then mixed. The mobile telephone device can individually and optimally correct each of the sound input from the microphone 12 and the sound received using the communication unit 33.

Preferable embodiments have been described above, but the present invention is not limited to the aforementioned embodiments and can be implemented as various types of embodiments. For example, the abovementioned embodiments have described the mobile telephone device 1 as a portable electronic device, but are not limited thereto. For example, the portable electronic device may be a PHS (registered trademark: Personal Handyphone System).

In the abovementioned embodiments, in a case in which the sound input from the microphone 12 and the demodulated sound are output to the correcting unit 35, when the switching operation is performed by the operation unit 11, the control unit 34 switches the output destination of the sound to the receiver 23, but it is not limited thereto. In a case in which the sound input from the microphone 12 and the demodulated sound are output to the correcting unit 35, when the switching operation is performed by the operation unit 11, the control unit 34 may output the sound input from the communication processing unit 332, from the receiver 23, and output the sound input from the microphone 12 to the correcting unit 35.

In a case in which the sound input from the microphone 12 and the demodulated sound are output to the correcting unit 35, when the switching operation is performed by the operation unit 11, the control unit 34 may output the sound input from the microphone 12, and the sound input from the communication processing unit 332, from the receiver 23.

The control unit 34 may receive selection via the operation unit 11 from patterns of outputting sound to the receiver 23, the correcting unit 35 and the communication unit 33 described above. In this case, the control unit 34 executes control of outputting sound to the receiver 23, the correcting unit 35 and the communication unit 33, based on the selected pattern of outputting.

The abovementioned embodiments have described that the control unit 34 directly outputs the sound input from the microphone 12 to the communication unit 33, but are not limited thereto. When the sound is corrected by the correcting unit 35, the control unit 34 may output the sound thus corrected, to the communication unit 33.

In the present embodiments, the configuration of the mobile telephone device of a so-called folder type has been described, but it is not limited thereto. The mobile telephone device according to the present invention may be of a type in which the first body 2 and the second body 3 are disposed in one body without a connecting portion (straight type). The mobile telephone device according to the present invention may be of a slider type, in which one of the first body 2 and the second body 3 slides in one direction in a state where the bodies are mutually superimposed. The mobile telephone device according to the present invention may be of a rotating type, in which one of the first body 2 and the second body 3 is rotated around an axis line along the direction of superimposing the bodies.

The present invention includes a sound output method for outputting sound by a portable electronic device including a communication unit, an input unit that receives sound, an output unit that outputs sound, and a correcting unit that corrects quality of sound, in which the method includes the step of outputting, by the output unit, sound input from the input unit and corrected by the correcting unit, and sound received by the communication unit, while a telephone call is being made by the communication unit.

The present invention includes a sound output program for outputting sound by a portable electronic device including a communication unit, a sound input unit that receives sound, a sound output unit that outputs sound, and a correcting unit that corrects quality of sound, in which the program causes the portable electronic device to execute the step of outputting, by the output unit, sound input from the input unit and corrected by the correcting unit, and sound received by the communication unit, while a telephone call is being made by the communication unit.

What is claimed is:

1. A portable electronic device, comprising:
   a communication unit configured to perform a telephone call;
   a microphone configured for input of sound;
   a correction unit configured to correct quality of sound; and
   when the telephone call is being made by the communication unit, a receiver configured to output sound after sound correction, the sound obtained by correcting with the correction unit the sound quality of sound input to the microphone, and sound received by the communication unit and not subjected to correction of sound quality by the correction unit; wherein
   when the telephone call is being made by the communication unit after performance of a first switching operation, the receiver outputs sound after the sound correction, the sound obtained by correcting with the correction unit the sound quality of sound input to the microphone, and sound after the sound correction, the sound received by the communication unit and obtained by correcting the sound quality with the correction unit;

when the telephone call is being made by the communication unit after performance of a second switching operation, the receiver outputs sound input to the microphone and not subjected to the correction of sound quality by the correction unit, and sound received by the communication unit and not subjected to the correction of sound quality by the correction unit; and the communication unit sends one of sound obtained by correcting with the correction unit the sound quality of sound input by the microphone, and sound input by the microphone and not subjected to correcting the sound quality with the correction unit.

* * * * *